United States Patent Office 3,272,999
Patented Sept. 13, 1966

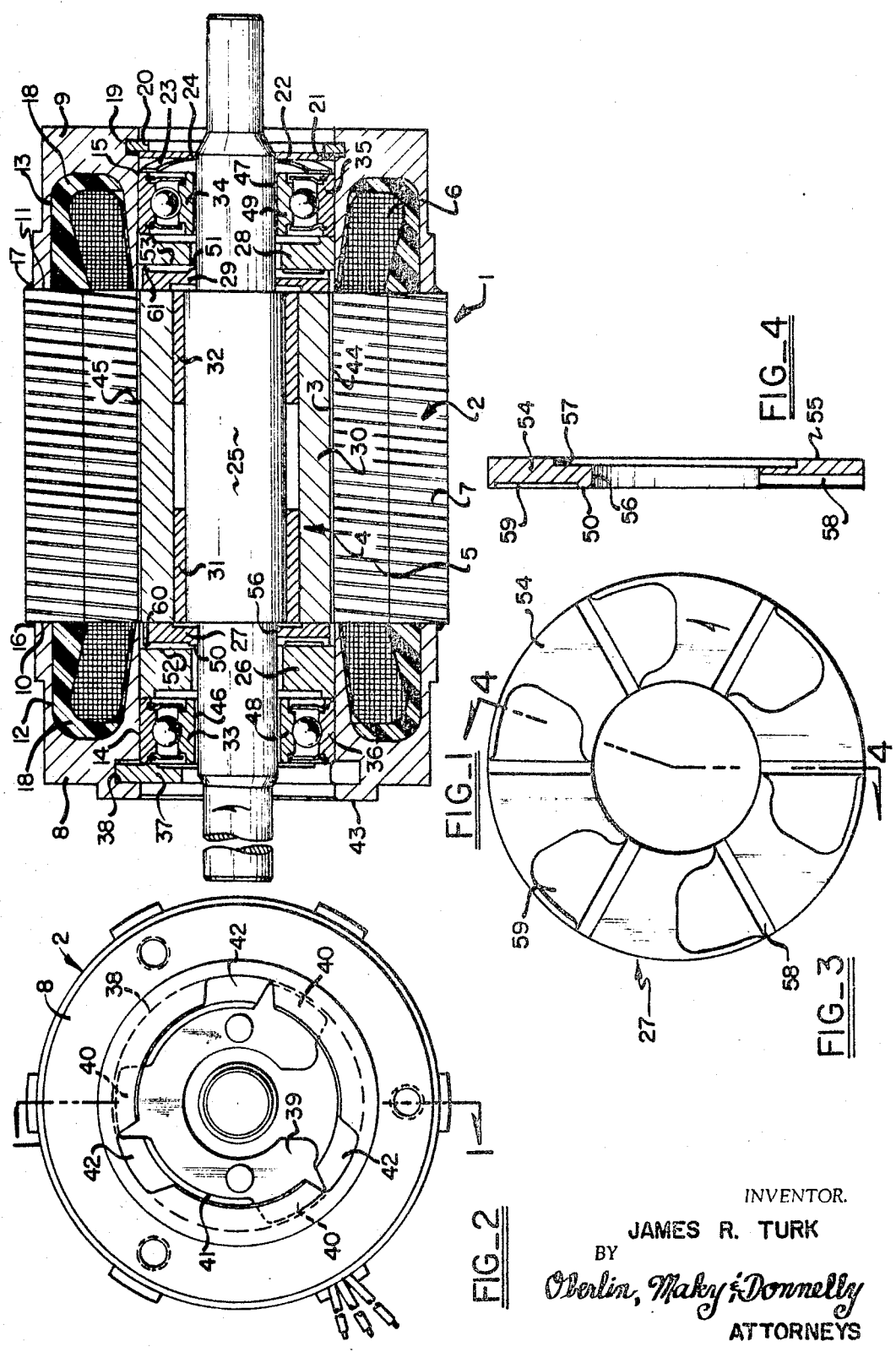

3,272,999
AIR BEARINGS FOR DYNAMOELECTRIC MACHINE
James R. Turk, Solon, Ohio, assignor to Vincent K. Smith, Gates Mills, Ohio
Filed Oct. 17, 1963, Ser. No. 316,884
9 Claims. (Cl. 310—90)

The present invention relates generally, as indicated, to an air bearing for a dynamoelectric machine and, more particularly, to a dynamoelectric machine which utilizes the air gap between the cylindrical surface of the rotor and the stator bore as an air bearing.

Heretofore, one of the shortcomings of using air bearings in machines was that during starting and stopping there was metal-to-metal contact between the co-operating surfaces thereof. After repeated cycling, the abrasion which resulted due to such metal-to-metal contact could cause seizure of the rotor. Furthermore, when devices such as flywheels were attached to the output shaft of the motor, large radial unbalance forces were exerted thereby until they were tuned, which forces would destroy most normal dynamic fluid bearings.

Accordingly, it is a principal object of this invention to provide a dynamoelectric machine with a novel ball bearing and air bearing arrangement that eliminates metal-to-metal contact between the co-operating surfaces of the machine during starting and stopping.

Another object of this invention is to provide a dynamoelectric machine with such a bearing arrangement that absorbs any large radial unbalance forces which may be exerted on the output shaft.

It is another object of this invention to provide a dynamoelectric machine which operates on air bearings at normal operating speeds and on anti-friction ball bearings at starting and stopping speeds.

It is another object of this invention to provide a dynamoelectric machine with a novel axial thrust washer design which creates an air bearing for axial thrust loads on the output shaft.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative however, of but a few of the various ways in which the principle of the invention may be employed.

In said annexed drawings:

FIG. 1 is a central cross-section view through a dynamoelectric machine embodying my novel bearing arrangement;

FIG. 2 is an end elevation view of the dynamoelectric machine as viewed from the left of FIG. 1;

FIG. 3 is an end elevation view of the thrust washer for such machine; and

FIG. 4 is a sectional view taken on the plane of the line 4—4 in FIG. 3.

Referring now in detail to FIG. 1 of the drawings, I have illustrated therein by way of example a hysteresis motor 1 which comprises a stator assembly 2 having a cylindrical bore 3 in which is mounted a rotor assembly 4. The stator assembly is preferably of the construction disclosed in the Vincent K. Smith Patent No. 2,565,530, dated August 28, 1951, in which there is provided a stack of spider laminations 5 having radially extending slots into which the stator coils 6 are wound and a stack of yoke laminations 7 is heat shrunk onto the wound spider laminations 5.

End rings 8 and 9 are disposed adjacent the ends 10 and 11, respectively, of the stator assembly in such a manner that the end loops of the stator coils 6 extend into the annular cavities 12 and 13 and the central openings 14 and 15 are in concentric alignment with the stator bore, such end rings being secured in place as by welding at 16 and 17.

The space within the annular cavities not occupied by the end loops is filled with an epoxy casting resin 18 in any well known manner, as, for example, by placing the assembly in a vacuum of 28–29″ Hg and pouring the resin through an opening (not shown) in the end rings.

The end ring 9 has an annular groove 19 in the central opening 15 thereof in which a retainer 20 is inserted. Adjacent the inner face 21 of the retainer there is disposed a spring 22 which includes resilient fingers 23 extending axially inwardly and radially outwardly from hub portion 24.

Concentrically disposed within the stator bore is the rotor assembly 4 comprising a rotor shaft 25 having spacer 26 and thrust washer 27 on one end thereof and spacer 28 and thrust washer 29 on the other end, and a high hysteretic rotor shell 30 as of cobalt alloy secured to the shaft by non-magnetic sleeves 31 and 32 that are press fits on shaft 25 and in the ends of shell 30. Said shaft 25 is journaled in precision ball bearings 33 and 34 in the end rings 8 and 9.

The rotor assembly is axially yieldably urged by the resilient fingers 23 toward the left as viewed in FIG. 1, such fingers pressing against the outer race 35 of the anti-friction bearing 34, thus urging the outer race 36 of the anti-friction bearing 33 into engagement with the retainer 37 disposed in an annular groove 38 formed in the surface of the central opening 14 of the end ring 8. The retainer 37 comprises a split ring 39 (see FIG. 2) having three radially outwardly extending projections 40 equally spaced around the outer periphery 41 which are adapted to be inserted through complementary notches 42 extending from the outer surface 43 of the end ring 8 into the annular groove 38.

Thus when it is desired to remove the rotor assembly from the stator bore, it is only necessary to slightly compress the split ring 39, rotate the same until the projections 40 are in alignment with the notches 42, pull the ring outwardly through the notches, and slide the rotor assembly outwardly through the opening 14 in the end ring 8. Conversely, when it is desired to assemble the rotor assembly within the stator bore, it is only necessary to slide such assembly inwardly through the opening 14 until the outer race 35 of the bearing 34 comes into engagement with the resilient fingers of the spring 22 and insert the retainer 37 into the annular groove 38 by slightly compressing the split ring, aligning the projections 40 with the slots 42 in the outer face of the end ring 8, inserting the ring through the slots into the annular groove 38, rotating the split ring within the groove until the projections thereon are out of alignment with such notches, and releasing the split ring so that the projections are forced into frictional engagement with the inner surface of the annular groove 38.

The rotor 30 has a smooth outer cylindrical surface 44 which is complemental with the smooth cylindrical surface of the stator bore and is so dimensioned that when the rotor assembly is disposed within the stator bore, there is a minute air gap 45 between such cylindrical surfaces which constitutes an air bearing when the rotor is rotated at its normal operational speed. Further, the ends of the rotor shaft 25 journaled in the ball bearings 33 and 34 are so dimensioned that the outer cylindrical surfaces thereof define minute air gaps 46 and 47 with the cylindrical bores of the inner races 48 and 49, respectively, of such ball bearings, which gaps constitute two more air bearings when the rotor is rotating at operational speeds.

The air gaps 46 and 47 between the ends of the rotor shaft and the bores of the inner races 48 and 49 are slightly smaller than the air gap between the outer cylindrical surface 44 and the cylindrical surface of the stator bore so that when the rotor is at rest or is rotating at starting and stopping speeds, it is maintained out of contact with the stator bore by the ball bearings 33 and 34. Thus it can be seen that when the rotor is at rest or is rotating at slow speeds, metal-to-metal contact between the cooperating surfaces of the rotor and stator is eliminated, since the ends of the rotor are supported by the inner races of the bearings 33 and 34, such inner races turning with the rotor shaft due to the contact therebetween. Moreover, any large radial unbalance forces which may be exerted on the rotor shaft will be absorbed by the ball bearings until the force is eliminated.

This contact between the inner races of the ball bearings and the rotor shaft will continue until the rotor shaft is rotated at such a speed that sufficient hydrodynamic pressure is reached in the air gaps 46 and 47 as well as in the air gap 45 to lift the rotor concentrically within the inner races of the ball bearings, at which time such inner races will cease turning.

The thrust washers 27 and 29 also produce air bearings between the outer surfaces 50 and 51 thereof and the inner surfaces 52 and 53 of the spacers 26 and 28, respectively, when the rotor is rotating at operational speeds to substantially eliminate any axial thrust that might be exerted on the rotor shaft.

Since the thrust washers are substantially identical in construction, only thrust washer 27 will be described in detail.

The thrust washer 27 includes a disc-shaped body member 54 having inner and outer faces 55 and 50, respectively, and an axial bore 56 extending therethrough. The disc-shaped body member has an outside diameter which is slightly less than the diameter of the central opening 14 of the end ring 8 so that there is a clearance therebetween and a bore diameter substantially the same as the diameter of the end of the rotor shaft 25 so that the washer frictionally engages the shaft. As can be more clearly seen in FIGS. 3 and 4, a counterbore 57 extends into the washer from the inner face 55 and six equally spaced, radially outwardly extending slots 58 are disposed in the outer face 50. Adjacent each slot there is provided a depression or pocket 59 having a depth substantially less than the depth of the slots, such pockets being located to the right of the slots as viewed in FIG. 3 from the axis of the washer looking in the direction of such slots. The construction of the thrust washer 29 is identical to that of thrust washer 27, except that the pockets thereof are disposed to the left of the slots rather than to the right.

In operation, when the rotor shaft is rotated in the direction of the arrow, air is forced radially outwardly in the slots 58 and trapped in the pockets 59, and is directed by such pockets against the inner faces 52 and 53 of the spacers 26 and 28, respectively. When sufficient hydrodynamic pressure is developed by the pockets, an air bearing is created between the inner faces 52 and 53 of the spacers 26 and 28 and the outer faces 50 and 51 of the thrust washers 27 and 29. When this occurs, the rotor 30 and the rotor shaft 25, as well as the thrust washers 27 and 29, the spacer 28, and the ball bearing 34 are forced to the right as viewed in FIG. 1 against the resilient fingers 23 of the spring 22 by the hydrodynamic pressure exerted on the inner face of the spacer 26, thus creating an air gap 60 between the inner face 52 of the spacer 26 and the outer face 50 of the thrust washer 27. Moreover, the spacer 28 and ball bearing 34 are forced further to the right against the resilient spring fingers by the hydrodynamic pressure exerted on the inner face 53 of the spacer 28, thus creating an air gap 61 between such inner face of the spacer 28 and the outer face 51 of the thrust washer 29.

Thus as can easily be seen, when the rotor 25 is at rest or when it is rotating at starting and stopping speeds, there will be slight metal-to-metal contact between the outer faces 50 and 51 of the thrust washers 27 and 29 and the inner faces 50 and 53 of the spacers 26 and 28. However, as the rotor approaches its normal operational speed, air gaps 60 and 61 will be formed between such inner and outer faces and air bearings will be produced therein, which bearings will absorb any axial thrust exerted on the rotor shaft.

Since the particular widths of the air gaps between the outer cylindrical surface 44 of the rotor 30 and the stator bore and between the ends of the rotor shaft 25 and the bores of the ball bearings 33 and 34 are dependent on many variables, such as the length of the cooperating surfaces, their diameters, the speed of the rotor, and the temperature, no formula can be given for determining such widths. However, by way of example, I have found that an air gap of .0003″ between the outer surface 44 of the rotor 30 and the stator bore and air gaps of .0002″ between the ends of the rotor shaft 25 and the bores of the ball bearings 33 and 34 will produce the above noted results when the length of the cooperating surfaces between such rotor and stator is equal to 1.47″, the diameter of such rotor is equal to .85″, the length of the cooperating surfaces between the rotor shaft and the ball bearings is equal to .28″, the diameter of such rotor shaft is equal to .35″, and the normal operating speed of the rotor shaft is 14,400 r.p.m. When operating at such speed, the rotor shaft has a radial load capacity equal to about 1 lb. Should the load exceed 1 lb., the air film between the ends of the rotor shaft and the bores of the ball bearing will be reduced below .0001″, which for my purposes, is not sufficient to be effective as an air bearing.

The inner races 48 and 49 of the ball bearings 33 and 34 will turn with the rotor shaft 25 until the speed thereof exceeds 100 r.p.m., at which time sufficient hydrodynamic pressure is developed in the air gaps 46 and 47 to lift the rotor 25 concentrically within such inner races so that they cease turning. However, while the air bearings are operative when the rotor shaft is rotating at speeds greater than 100 r.p.m., the radial load capacity is very small until speeds of 12,000 r.p.m. or greater are reached.

Further, I have found that slots .031″ deep and .031″ wide and pockets .0002″ to .0004″ deep in the thrust bearings 27 and 29 will create the desired air bearings 60 and 61 between the inner faces 52 and 53 of the spacers 26 and 28 and the outer faces 50 and 52 of the thrust washers 27 and 29 when the rotor shaft 25 is rotating at 14,400 r.p.m. At such speeds the air film between such surfaces has a width equal to about .0002″ and is capable of absorbing an axial thrust load of about ¾ lb.

While the above discussion has been directed only to the use of air as the fluid for creating the bearing or supporting film, it should be understood that any liquid or gas can be so used. However, air is generally used since it is usually already present in the machine.

Other modes of applying the principles of the invention may be employed, change being made as regards the details described, provided the features stated in any of the following claims or the equivalent of such be employed.

I therefore, particularly point out and distinctly claim as my invention:

1. A dynamoelectric machine comprising a stator assembly having a smooth cylindrical bore; a rotor having a rotor shaft concentrically disposed within said bore, said rotor having a smooth cylindrical surface which is complemental with the surface of said station bore and defines therewith a minute air gap in which there is produced an air film when said rotor is rotated at operational speeds; ball bearings disposed adjacent the ends of said stator assembly, the ends of said rotor shaft being journaled in said ball bearings; minute air gaps between the ends of said rotor shaft and said ball bearings, said air gaps being slightly smaller than the air gap between the surfaces of said bore and rotor so that when the rotor is at rest or is rotating at starting and stopping speeds, said rotor is maintained out of contact with said stator, but sufficiently large to constitute an air film when said rotor is rotating at operational speeds; said air films being adapted to maintain the ends of said rotor shaft out of contact with said bearings.

2. A dynamoelectric machine comprising a stator assembly having a smooth cylindrical bore; a rotor assembly concentrically disposed within said bore, said rotor assembly including a rotor having a smooth outer cylindrical surface which is complemental with the bore of said stator assembly and defines therewith a minute gap which constitutes an air bearing during operational speeds of said rotor, and a rotor shaft extending through said rotor beyond the ends thereof; ball bearings disposed adjacent the ends of said stator assembly, said rotor shaft being journaled in said bearings with minute air gaps between said shaft and bearings which also constitute air bearings during said operational speeds, said latter air gaps having a smaller width than said first mentioned air gap so that when said rotor is at rest or is rotating at starting and stopping speeds, there will be contact only between said ball bearings and shaft.

3. The dynamoelectric machine of claim 2 wherein the operational speed of said rotor is greater than 12,000 r.p.m.

4. The dynamoelectric machine of claim 2 wherein the air gap between said rotor and stator is equal to .0003" and the air gaps between said rotor shaft and said ball bearings is equal to .0002".

5. The dynamoelectric machine of claim 2 further including spacers disposed on said rotor shaft adjacent and inwardly of said ball bearings, said spacers having smooth inner surfaces; thrust washers frictionally engaging said rotor shaft adjacent the inner surfaces of said spacers; and means on said thrust washers for creating an air film between the inner surfaces of said spacers and the outer surfaces of said washers when said rotor shaft is rotating at operational speeds.

6. The dynamoelectric machine of claim 5, wherein the means on said thrust washers for creating air films include a plurality of radially outwardly extending slots in the outer faces of said washers and pockets in said outer faces disposed adjacent said slots, whereby when said shaft is rotated, air is forced radially outwardly in said slots, trapped in said pockets and directed thereby against the inner faces of said spacers.

7. A dynamoelectric machine comprising a stator and rotor having complemental smooth cylindrical surfaces defining a minute gap therebetween in which there is produced a fluid bearing during normal relative rotation of said stator and rotor; anti-friction ball bearings at the ends of said stator; said rotor having oppositely extending shaft portions which are journalled in their respective ball bearings; minute gaps between said shaft portions of said rotor and said ball bearings in which there are produced additional fluid bearings during normal relative rotation of said stator and rotor, said minute gaps between said shaft portions and ball bearings being smaller than the minute gap between said stator and rotor, whereby said rotor is maintained out of contact with said stator by said ball bearings when said rotor is at rest or when it is accelerated or decelerated from or to zero speed; said shaft portions of said rotor, during normal rotation of the latter, being maintained out of contact with said ball bearings by the fluid bearings produced in said minute gaps as aforesaid.

8. A dynamoelectric machine comprising a stator having a cylindrical bore therein, ball bearings at the ends of said stator, and a rotor disposed concentrically within said stator bore, said rotor having oppositely extending shaft portions journalled in their respective ball bearings for supporting said rotor at rest or during acceleration or deceleration from or to zero speed, and minute gaps between said shaft portions and ball bearings which constitute fluid bearing means during operational speeds of said rotor for supporting said shaft portions concentrically within said ball bearings out of contact with said ball bearings.

9. The dynamoelectric machine of claim 8 wherein said minute gaps between said shaft portions and ball bearings are .0002".

References Cited by the Examiner

UNITED STATES PATENTS

| | | | |
|---|---|---|---|
| 2,362,667 | 11/1944 | Schmidt | 308—160 |
| 2,829,288 | 5/1958 | Shaefer | 310—90 |
| 2,937,294 | 5/1960 | Macks | 310—90 |

MAX L. LEVY, *Primary Examiner.*

MILTON O. HIRSHFIELD, *Examiner.*

J. W. GIBBS, *Assistant Examiner.*